United States Patent
Rodgers

(10) Patent No.: US 8,098,657 B2
(45) Date of Patent: Jan. 17, 2012

(54) SYSTEM AND METHOD FOR PROVIDING DATA COMMONALITY IN A PROGRAMMABLE TRANSPORT DEMULTIPLEXER ENGINE

(75) Inventor: Stephane W. Rodgers, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 1251 days.

(21) Appl. No.: 11/328,877

(22) Filed: Jan. 10, 2006

(65) Prior Publication Data

US 2006/0268864 A1  Nov. 30, 2006

Related U.S. Application Data

(60) Provisional application No. 60/685,779, filed on May 31, 2005.

(51) Int. Cl.
*H04L 12/28* (2006.01)

(52) U.S. Cl. .......................... 370/389; 709/231

(58) Field of Classification Search .................. 370/389, 370/465; 704/270; 709/231
See application file for complete search history.

(56) References Cited

U.S. PATENT DOCUMENTS

| | | |
|---|---|---|
| 4,473,904 A | 9/1984 | Suehiro et al. |
| 5,021,897 A | 6/1991 | Yoshino et al. |
| 5,621,772 A | 4/1997 | Maturi et al. |
| 5,638,370 A | 6/1997 | Seconi et al. |
| 5,652,749 A | 7/1997 | Davenport et al. |
| 5,831,678 A | 11/1998 | Proctor |
| 5,959,659 A | 9/1999 | Dokic |
| 6,263,469 B1 | 7/2001 | Jang |
| 6,275,507 B1 | 8/2001 | Anderson et al. |
| 6,453,115 B1 | 9/2002 | Boyle |
| 6,598,034 B1 | 7/2003 | Kloth |
| 6,665,725 B1 | 12/2003 | Dietz et al. |
| 6,717,952 B2 * | 4/2004 | Jones et al. ............. 370/465 |
| 6,738,846 B1 | 5/2004 | Slaughter et al. |
| 6,747,991 B1 | 6/2004 | Hemy et al. |
| 6,823,131 B2 | 11/2004 | Abelard et al. |
| 6,922,730 B1 | 7/2005 | Yaple |
| 6,925,052 B1 | 8/2005 | Reynolds et al. |
| 6,980,209 B1 * | 12/2005 | Donham et al. ............. 345/426 |
| 7,039,048 B1 | 5/2006 | Monta et al. |
| 7,349,395 B2 | 3/2008 | Liu et al. |
| 7,349,428 B2 | 3/2008 | Hulmani et al. |
| 7,415,014 B2 | 8/2008 | Chen et al. |
| 7,526,182 B2 | 4/2009 | Shibutani |
| 2001/0005447 A1 | 6/2001 | Kawamura et al. |
| 2001/0026561 A1 | 10/2001 | Morris et al. |
| 2001/0039615 A1 * | 11/2001 | Bowker et al. ............. 713/162 |
| 2002/0001309 A1 | 1/2002 | Saito |
| 2002/0067744 A1 | 6/2002 | Fujii et al. |
| 2002/0105905 A1 | 8/2002 | Boyle et al. |
| 2002/0150123 A1 | 10/2002 | Ro |
| 2003/0072555 A1 | 4/2003 | Yap et al. |

(Continued)

*Primary Examiner* — Dang Ton
*Assistant Examiner* — Wei Zhao
(74) *Attorney, Agent, or Firm* — McAndrews, Held & Malloy, Ltd.

(57) ABSTRACT

A method and system are provided for providing data commonality in a programmable transport demultiplexer engine. The method may involve utilizing a hardware assist block to process a portion of an incoming data packet, which may result in a partially processed data packet. The data packet may comprise data in any one of video formats and/or audio formats. A firmware block may then execute a plurality of instructions to process the partially processed data packet. The plurality of instructions may be independent of video and/or audio formats associated with the data packet.

52 Claims, 6 Drawing Sheets

U.S. PATENT DOCUMENTS

| | | |
|---|---|---|
| 2003/0217362 A1 | 11/2003 | Summers et al. |
| 2004/0205332 A1* | 10/2004 | Bouchard et al. ............. 713/153 |
| 2004/0258060 A1 | 12/2004 | Liu et al. |
| 2005/0015794 A1 | 1/2005 | Roelens |
| 2005/0091057 A1* | 4/2005 | Phillips et al. ............. 704/270.1 |
| 2005/0132264 A1* | 6/2005 | Joshi et al. ................. 715/500.1 |
| 2005/0138243 A1 | 6/2005 | Tierney et al. |
| 2005/0259960 A1 | 11/2005 | Wan et al. |
| 2006/0029139 A1 | 2/2006 | Teichner et al. |
| 2006/0080110 A1 | 4/2006 | Foster et al. |
| 2006/0104305 A1 | 5/2006 | Yoshida et al. |
| 2006/0136981 A1 | 6/2006 | Loukianov |

* cited by examiner

SYSTEM AND METHOD FOR PROVIDING DATA COMMONALITY IN A PROGRAMMABLE TRANSPORT DEMULTIPLEXER ENGINE

RELATED APPLICATIONS

The application makes reference to, claims priority to, and claims the benefit of U.S. Provisional Application Ser. No. 60/685,779 filed on May 31, 2005.

This application is also related to the following applications, each of which is incorporated herein by reference in its entirety:

U.S. patent application Ser. No. 11/348,563 filed Feb. 7, 2006;
U.S. patent application Ser. No. 11/385,468 filed Mar. 21, 2006;
U.S. patent application Ser. No. 11/394,877 filed Mar. 31, 2006; and
U.S. patent application Ser. No. 11/385,307 filed Mar. 21, 2006.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Processor-based demultiplexing engines may be required to maintain flexibility while processing incoming data at a high rate. Ideally, the size of instruction memory for such a system is kept as small as possible. If full firmware parsing of each individual format is implemented, the firmware would have a separate path established for each part of the parsing tree, and as a result the code size and processing time become very large. For example, to parse one type of data format versus another type, the parsing and error checking are sometimes completely different between the different formats. This results in more code, and longer processing time.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing data commonality in a programmable transport demultiplexer engine, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to processing video and audio signals. More specifically, certain embodiments of the invention relate to a method and system for providing data commonality in a programmable transport demultiplexer engine.

In video systems it may be desirable to support certain functions that may be handled by modern transport demultiplexers. Such functions may include, for example, receiving several streams which have been multiplexed together, and separating out whole streams or sub-streams at user discretion; parsing formats such as, for example, MPEG Transport, Directv Transport, PES, DVD, ES, and a variety of other formats; recognizing start code or frame synchronization patterns from several different ES layers; assisting in the frame synchronization for video and audio; providing ancillary information about the incoming data to assist the downstream audio or video decoders; providing timestamp management support; providing methods for synchronizing commands from software with the data stream; providing flexibility to support new, as-yet unanticipated formats, and being able to do all of the aforementioned functions at high speeds such as, for example, 200+Mbits/sec. In this regard, a fast yet programmable solution may be desirable. Such a solution may utilize a double buffer and/or a hardware assist and may be implemented in a record audio video engine (RAVE).

In an embodiment of the invention, a RAVE may support multiple decoders that support audio and/or video decoding. The RAVE may also support software for recording PVR data and accessing record data for video playback. Therefore, the RAVE may be a block that combines record functionalities and the audio/video transport parsing and demultiplexing functions. The RAVE may be capable of processing transport packets associated with each of the video decoding, audio decoding, and the record functions. The RAVE may also be capable of processing fixed-length sections of non-transport data. The RAVE may be designed such that it may provide flexibility to allow for subsequent algorithmic changes as may be needed by data format changes, for example. Additionally, the RAVE may maintain a high throughput.

Figure 1:
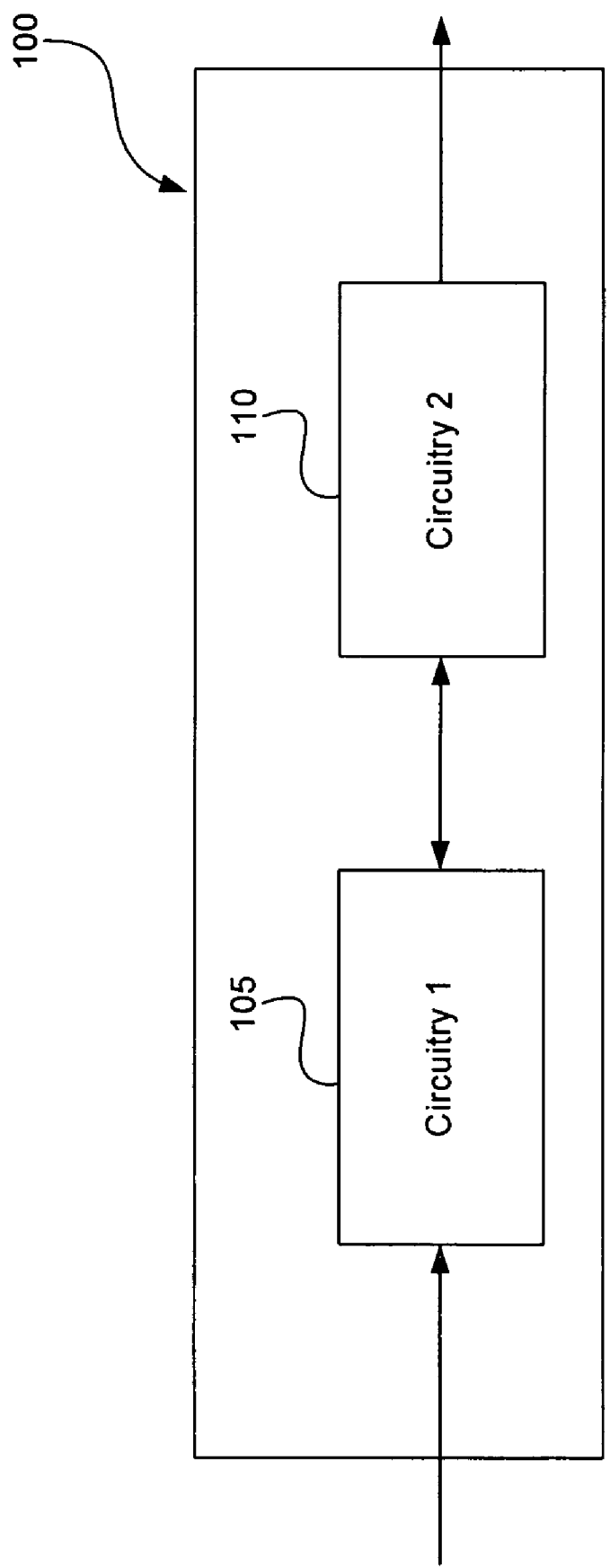
FIG. 1 illustrates a block diagram of exemplary architecture of a system, in accordance with an embodiment of the present invention

FIG. 1 illustrates a block diagram of exemplary architecture of a system 100, in accordance with an embodiment of the present invention. The system 100 may comprise a first circuitry 105 and a second circuitry 110. The system 100 processes incoming packets, where the first circuitry 105 partially processes a portion of a first packet, resulting in a partially processed first packet. The second circuitry 110 executes a set of instructions to process the remainder of the partially processed first packet. The first circuitry 105 partially processes a second packet while the second circuitry 110 is processing the remainder of the first packet. When the second circuitry 110 completes processing the first packet, the second circuitry 110 begins processing the remainder of the partially processed second packet, and at the same time, the first circuitry 105 partially processes a third packet. The processing continues where the first circuitry 105 partially processes a packet, while the second circuitry 110 processes the remainder of the partially processed previous packet.

In an embodiment of the invention, the first circuitry 105 may process a portion of an incoming packet, which may result in a partially processed packet. The packet may comprise data in any one of several video formats and/or audio formats. The video formats may be, for example, MPEG, VC1, or AVC. The audio formats may be, for example, AC3, AAC, and others. The second circuitry 110 executes a plurality of instructions to process the partially processed packet. The plurality of instructions may be independent of video and/or audio formats associated with the packet. As such, the same plurality of instructions is executed to process packets from the different formats.

Figure 2:
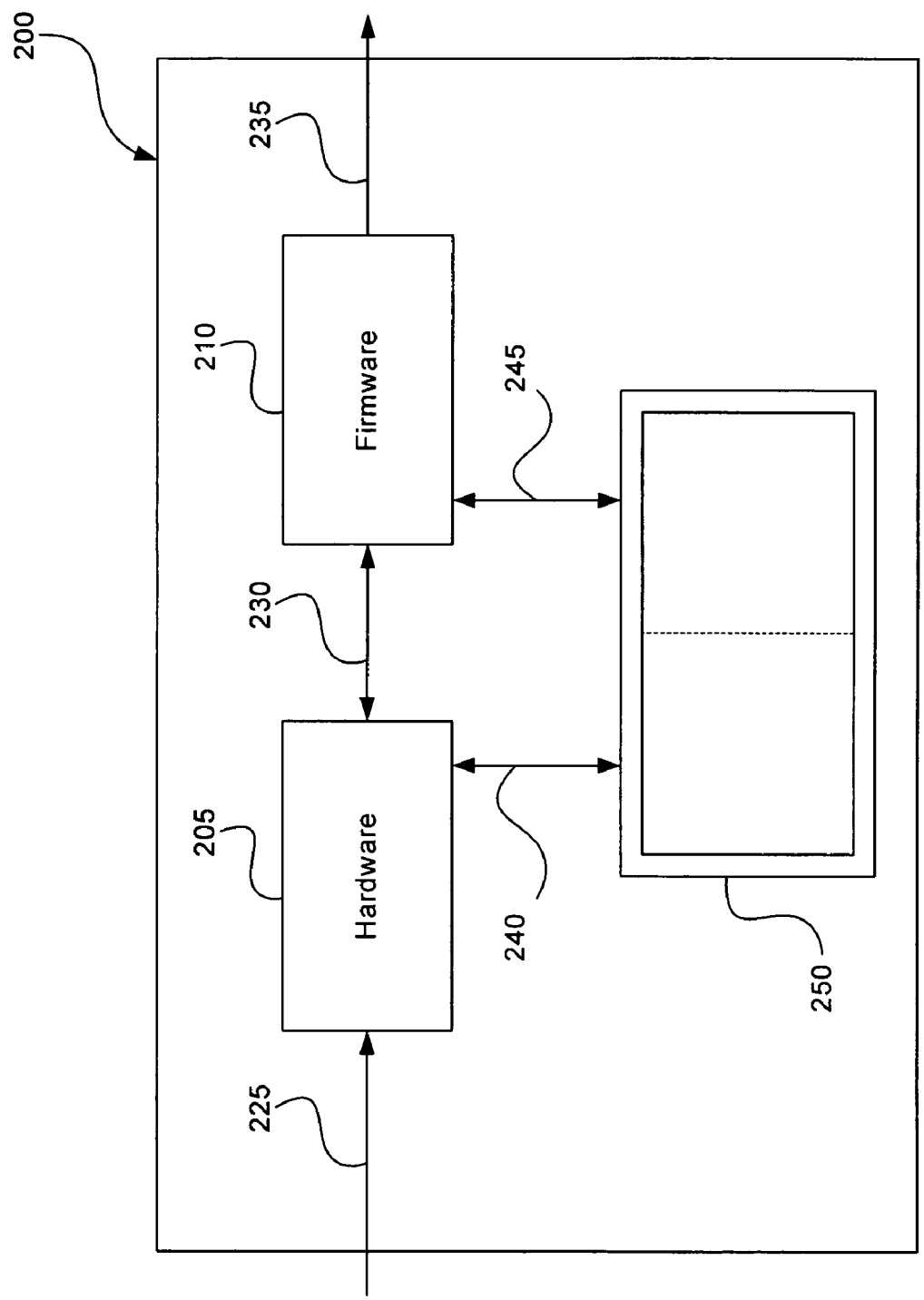
FIG. 2 illustrates a block diagram of exemplary architecture of a system 200, in accordance with an embodiment of the present invention.

FIG. 2 illustrates a block diagram of exemplary architecture of a system 200, in accordance with an embodiment of the present invention. The system 200 may comprise a hardware assist block 205, a firmware block 210, and a memory block 250. The input 225 may comprise transport data or fixed length chunks of data in an arbitrary format, where the data may comprise packets of video, audio, and record data. The hardware assist block 205 may then perform some processes and pass processed data to firmware block 210, either directly via data path 230 or indirectly via the buffer block 250. A portion of the processed data may be passed from the hardware assist block 205 via data path 240 to the memory block 250, which may then be accessed by the firmware block 210 via data path 245. U.S. patent application Ser. No. 11/385,468 filed Mar. 21, 2006 discusses several approaches of interfacing the hardware assist 205 and the firmware 210. Accordingly, U.S. patent application Ser. No. 11/385,468 filed Mar. 21, 2006 is hereby incorporated herein by reference in its entirety.

In an embodiment of the invention, input data 225 may comprise data in one of any one of a plurality of formats. The formats may vary based, for example, on the encoder used for encoding the data or the intended display for video data, etc. The input data 225 may be pre-processed in the hardware assist 205 to transcode data from each of the supported audio or video standards to a standard format. Certain information or parameters may be retrieved from the input data. The retrieved information and parameters can be transcoded to the standard format. The firmware 210 operates on the information and parameters in the standard format. Because the hardware 205 transcodes retrieved information and parameters from numerous audio and video standards to the common format, in certain embodiments of the invention, the firmware 210 may use a common thread of instructions to operate on the retrieved information and parameters from the numerous audio and video standards. Additionally, the hardware 205 may determine certain information about an input packet and transcode the determined information about the input packet to the common format for use by the firmware.

In an embodiment of the invention, the firmware 210 may utilize various pieces of information about the incoming data packet 225 to parse the data packet and send it to the memory 250. Some of the information fields utilized by the system 200 may be, for example: the number of ES bytes in the packet; the number of payload bytes in the packet; start of the payload; start/end of PES headers; presence of chunks of ES data split by PES headers; start of adaptation field; location of frame sync patterns with the packet; data extracted from a location after the frame sync pattern; location and presence of Presentation/Decode Time Stamp (PTS/DTS); presence of packet errors; and presence of PCR information. It should be understood that this list of information fields is not exhaustive, but illustrative, and other information fields may be associated with data packets.

The exemplary information fields listed hereinabove may vary depending on a data format. For example, the location of an "adaptation field" may be different for MPEG packets and DirecTV packets. Therefore, for packets that in MPEG and DirecTV formats different parsing algorithms may be utilized to determine the proper amount for the adaptation field, and the beginning of the adaptation field.

In an embodiment of the present invention, the fields associated with a data packet may be given a common meaning by the hardware assist 205, regardless of the data format. As a result, the firmware 210 may make decisions without having to determine the format of the incoming data 225. For example, the hardware assist 205 may give a common meaning to the fields associated with the data packets coming in, such that the firmware 210 may not have to make decisions based on incoming format type. Also, for example, the hardware assist 205 may have parsing capabilities to determine the start and end of the adaptation field, as well as the number of adaptation field bytes in a current packet. The parsing provided by the hardware assist 205 may vary from packet to packet depending on the packet format such as, for example, MPEG and DirecTV. The information resulting from the parsing may be the same regardless of the incoming packet type, and the parsing resulting information may then be presented to the firmware 210.

For the example of the adaptation field, the parsing resulting information may comprise the adaptation field start within the packet and the number of adaptation field bytes. The adaptation field start may be presented in terms of byte count from the beginning of the packet, for example.

In an embodiment of the invention, the information resulting from the parsing provided by the hardware assist 205 may be the same regardless of the type of the incoming packet, and hence, the firmware 210 does not distinguish between the information it receives in terms of the type of the packet from which it originated.

In an embodiment of the invention, some parsing within the adaptation field may be performed to look for a special sequence of data, for example. The firmware 210 may use the adaptation field start parameter to determine where to start looking for such a sequence, and as a result, the firmware 210 may not be concerned with the format of the incoming packet.

The information associated with an incoming packet 225 may be similarly presented to the firmware 210. For example, PES headers may be different in MPEG-2 versus MPEG-1. Parsing PES headers may be provided by the hardware assist 205, which may provide two different parsing methods based on the format (MPEG-2 v. MPEG-1), resulting in information that may be presented to the firmware 210 in one common format. As a result, the firmware 210 may receive, for example, regardless of the original format of the packets, information regarding the PES header start within the packet and the PES header end within the packet. The firmware 210 may retrieve, for example, the first sequence of bytes after the PES header, in which case, the firmware 210 may only need to look at the PES header end indicator to determine which byte to capture.

In an embodiment of the invention, the hardware assist 205 may be bypassed by the firmware 210, if desired. As a result, if desired, the firmware 210 may have full access to data packets in their original format, and the firmware 210 may perform its own parsing of the incoming data packets. In such an embodiment, where the firmware 210 handles the incoming data packets directly, the firmware 210 may be adapted to be able to apply different parsing techniques based on the format of the incoming data packet.

The hardware assist 205 may perform a portion of the functions associated with the processing of a transport packet, and may retrieve and transcode information associated with the transport packet as well. The hardware assist 205 may then set up the hardware assist fields and may write the retrieved and transcoded information to a location in the memory block 250. The hardware assist fields may comprise, for example, address of compare pattern, post-compare pattern data, start/end of PES headers, number of ES bytes in the packet, number of payload bytes in the packet, start of payload, presence of packet errors, type of packet (record or audio/video), etc.

In an embodiment of the invention, the hardware assist fields may be common and independent of the format of the incoming packet. In an embodiment of the invention, the information regarding the input format and the band may be provided in the case that it may be needed, but the firmware 210, for example, may not use it for normal packet processing. As a result of the commonality of the hardware assist fields, the instruction memory storing the firmware 210 may be small, because a single thread of instructions may parse and process the data from packets with numerous audio and video standards. Additionally, the throughput requirements may be met, even while maintaining full flexibility where the firmware 210 may still be able to perform parsing of all or a subset of data if desired.

Figure 3:
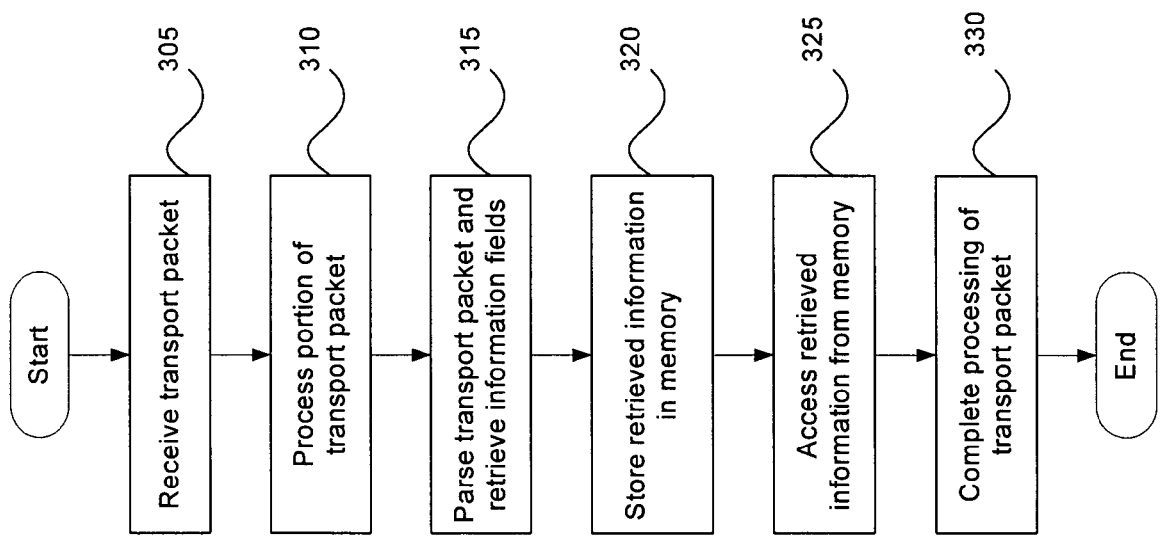
FIG. 3 illustrates a flow chart of a method for providing data commonality in a programmable transport demultiplexer engine, in accordance with an embodiment of the present invention.

FIG. 3 illustrates a flow chart of a method for providing data commonality in a programmable transport demultiplexer engine, in accordance with an embodiment of the present invention. At 305 a packet may be received. The hardware assist may process at least a portion of the packet at 310. The hardware assist may determine the format of the packet and may retrieve from the packet information to set up hardware assist fields. The hardware assist may then, based on the determined format, parse the packet at 315 and may set up the information fields to be used by the firmware. The information fields may be, for example: the number of ES bytes in the packet; the number of payload bytes in the packet; start of the payload; start/end of PES headers; presence of chunks of ES data split by PES headers; start of adaptation field; location of frame sync patterns with the packet; location and presence of Presentation/Decode Time Stamp (PTS/DTS); presence of packet errors; and presence of PCR information. The retrieved information may be stored in the memory in one common format regardless of the original format of the transport packet, at 320.

At a next block 325, the firmware may access from the memory the information retrieved from the transport packet by the hardware assist. The firmware may then complete processing the transport packet, using the retrieved information at 330. The firmware may use the same instruction thread for the parsing regardless of the original format of the transport packet. While the firmware completes processing the transport packet, the hardware assist may receive and begin processing at least a portion of the next transport packet.

Figure 4:
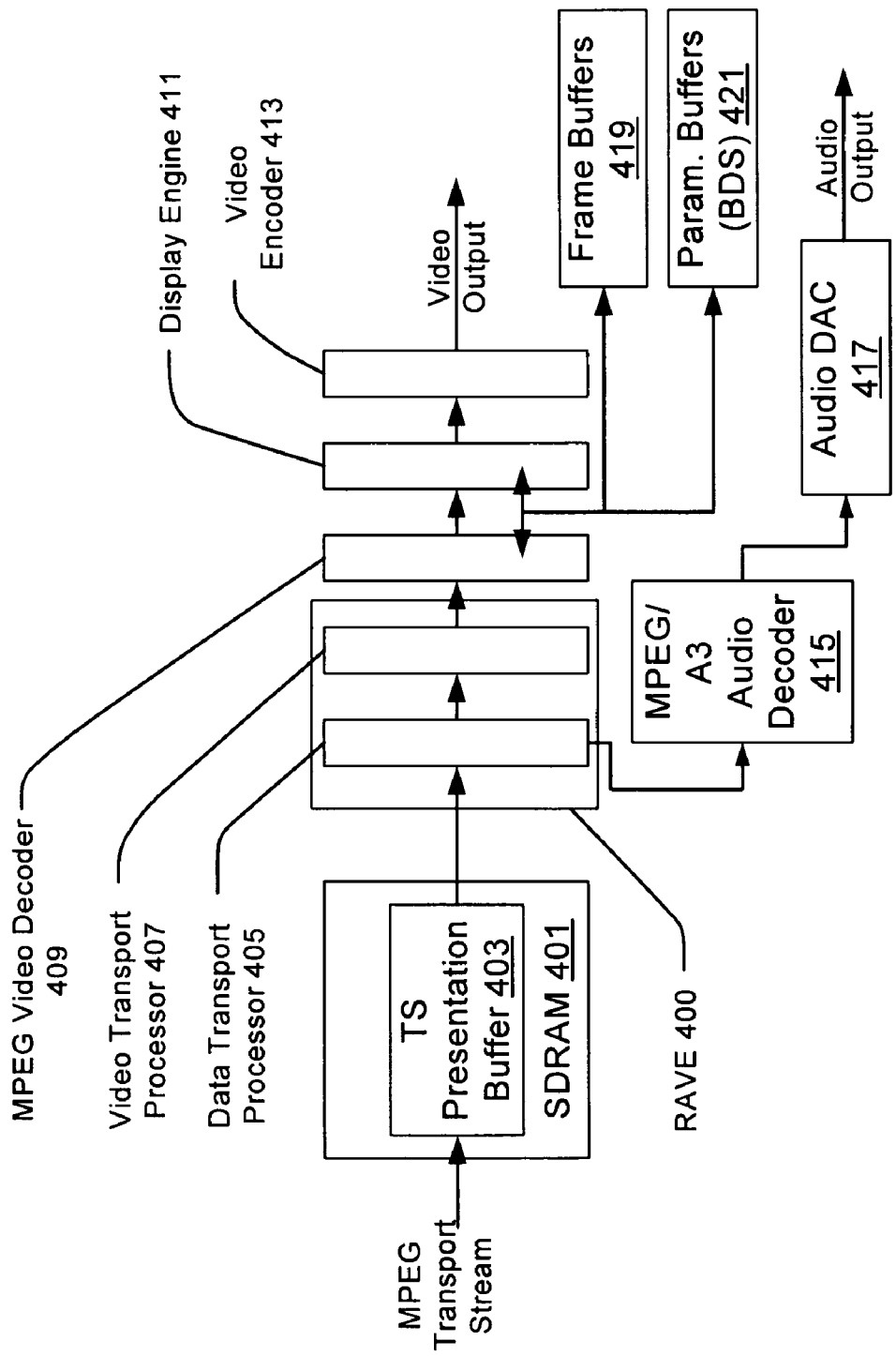
FIG. 4 illustrates a block diagram of an exemplary circuit for decoding compressed video data, in accordance with an embodiment of the present invention.

FIG. 4 illustrates a block diagram of an exemplary circuit for decoding compressed video data, in accordance with an embodiment of the present invention. Data may be received and stored in a buffer 403 within a Synchronous Dynamic Random Access Memory (SDRAM) 401. The data may be received from either a communication channel or from a local memory, such as, for example, a hard disc or a DVD.

The data output from the buffer 403 may then be passed to the RAVE. The data transport processor 405 may demultiplex the transport stream into packetized elementary stream constituents, and passes the audio transport stream to an audio decoder 415 and the video transport stream to a MPEG video decoder 409, for example. The audio data may then be sent to the output blocks, and the video may be sent to a display engine 411.

In certain embodiments of the present invention, the data transport processor 405 and the video transport processor 407 may comprise the RAVE 400. In an embodiment of the present invention, the transport stream may comprise record data, and audio/video data. The decoding circuit may also comprise a display engine 411, and a video encoder 413. Additionally, decoded images may be buffered in frame buffers 419.

Figure 5:
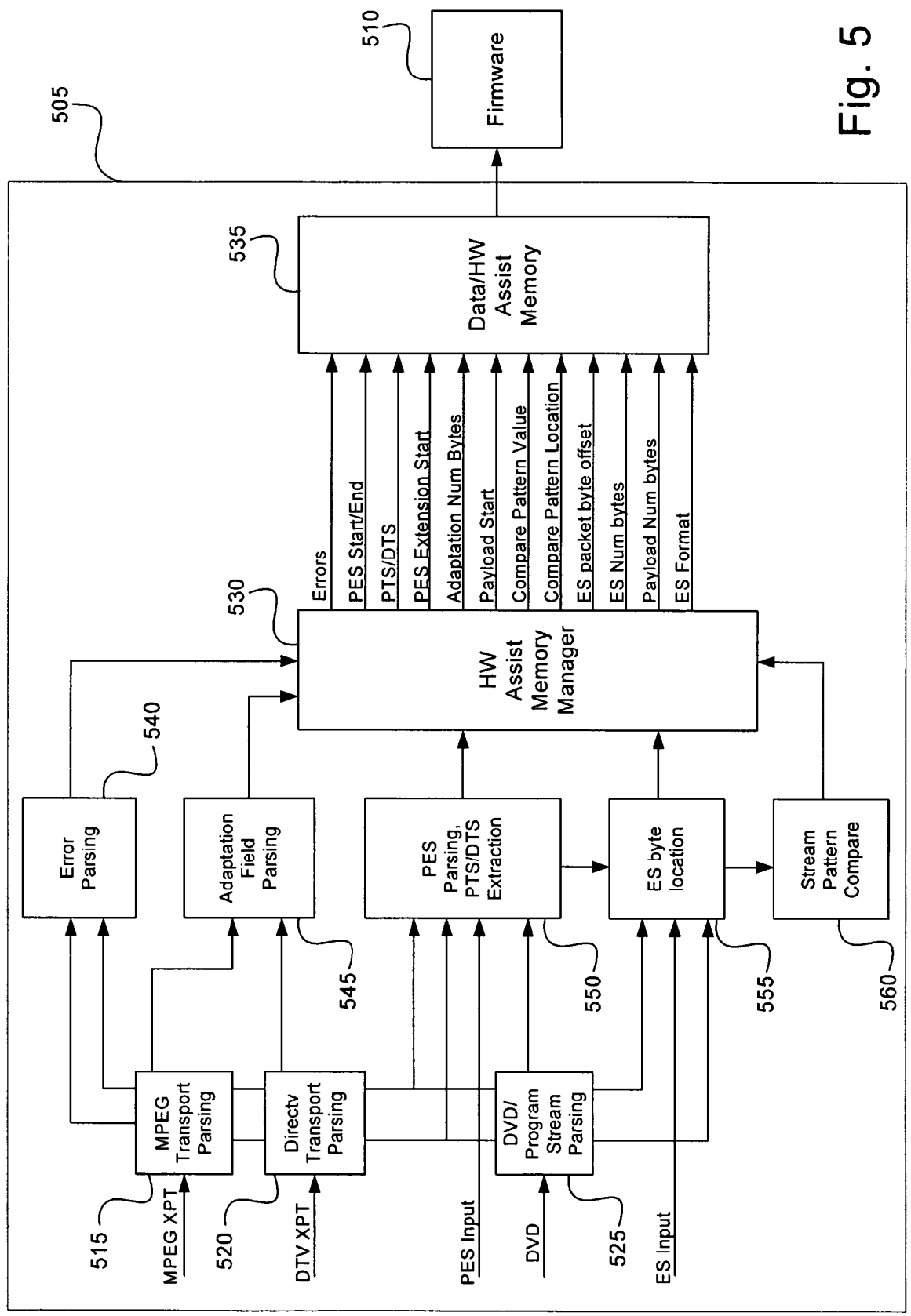
FIG. 5 illustrates a block diagram of an exemplary RAVE, in accordance with an embodiment of the present invention.

FIG. 5 illustrates a block diagram of an exemplary RAVE, in accordance with an embodiment of the present invention. The RAVE may comprise hardware assist 505 and firmware 510. The hardware assist 505 may preprocess incoming data packets, to provide them in a common format to the firmware 510. The hardware assist 505 may comprise transport parsing such as, for example, MPEG transport parsing 515, DirecTV transport parsing 520, DVD/program stream parsing 525, and others. Incoming transport packets may be input into the associated transport parsing unit. For example, if the incoming transport packet comprises MPEG data, then the transport packet is handled by the MPEG transport parsing 515. The parsing unit that handles the incoming transport packet may then output the information for further parsing according to the type of information such as, for example, error, adaptation field, PES, PTS/DTS, ES byte location, and stream pattern comparison. Therefore, the output from the initial parsing units (the MPEG transport parsing 515, the DirecTV transport parsing 520, and the DVD/program transport parsing 525) may be input into one or more of error parsing 540, adaptation field parsing 545, PES parsing/PTS-DTS extraction 550, ES byte location 555, and Stream Pattern Comparison 560.

The resulting parsed information may then be sent to a hardware assist memory manager 530, where the information may be organized and saved to the data/hardware assist memory 535. The parsed information may comprise, for example, errors, PES Start/End, PTS/DTS, PES Extension Start, Adaptation Num Bytes, Payload Start, Compare Pattern Value, Compare Pattern Location, ES Packet Byte Offset, ES Num Bytes, and ES Format. The parsed information may then be retrieved by the firmware 510, from the memory 535. The information retrieved by the firmware 510 may have a common format, and therefore, the firmware 510 may process the packets the same way regardless of their original format.

In an embodiment of the present invention, the inputs to the transport-parsing units 515, 520, and 525 may bypass the hardware assist 505 and be input directly to the firmware 510, if desired. In such an embodiment, the firmware 510 may have the capability to parse the inputs in their original formats.

Figure 6:
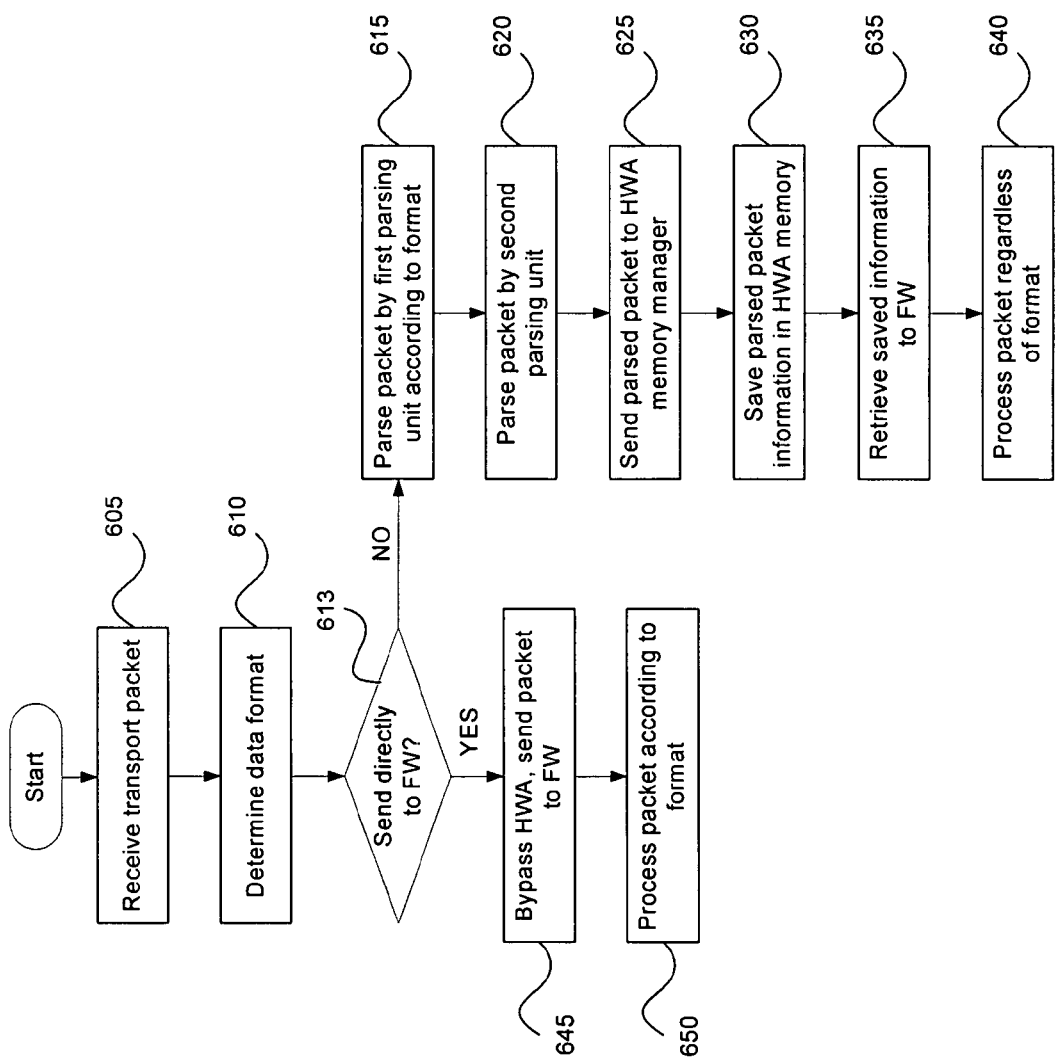
FIG. 6 illustrates a flow chart of a method for providing data commonality in a programmable transport demultiplexer engine, in accordance with an embodiment of the present invention.

FIG. 6 illustrates a flow chart of a method for providing data commonality in a programmable transport demultiplexer engine, in accordance with an embodiment of the present invention. At an initial block 605 the hardware assist 505 of FIG. 5, may receive a transport packet. The hardware assist may then determine the data format of the received transport packet at a next block 610. At a next decision block 613 it may be determined whether it may be desired to send the transport packet directly to the firmware.

If it is determined at decision block 613 that it is not desired to send the transport packet directly to the firmware, the transport packet may be parsed by a parsing unit associated with the data format of the transport packet at 615. The parsing unit may comprise, for example, one of MPEG transport parsing 515, DirecTV transport parsing 520, and DVD/program stream parsing 525. For example, if the incoming transport packet comprises MPEG data, then the transport packet is handled by the MPEG transport parsing 515.

The parsing unit that handles the incoming transport packet may then send the parsed information for further parsing by another set of parsing units, at a next block 620. The parsed information may comprise information such as, for example, error, adaptation field, PES, PTS/DTS, ES byte location, and stream pattern comparison. The second set of parsing units may, for example, comprise at least one of the following: error parsing 540, adaptation field parsing 545, PES parsing/PTS-DTS extraction 550, ES byte location 555, and Stream Pattern Comparison 560.

The parsed information output by the second set of parsing units may then be sent to a hardware assist memory manager where the information may get organized, at a next block 625. The hardware assist memory manager may then save the information to the data/hardware assist memory at a next block 630. The parsed information saved to the data/hardware assist memory may comprise, for example, errors, PES Start/End, PTS/DTS, PES Extension Start, Adaptation Num Bytes, Payload Start, Compare Pattern Value, Compare Pattern Location, ES Packet Byte Offset, ES Num Bytes, and ES Format. The saved parsed information may then, at a next block 635, be retrieved by the firmware, from the memory. The information retrieved by the firmware may have a common format, and therefore, the firmware may process the packets, at a next block 640, the same way regardless of their original format.

If it is determined at decision block 613 that it is desired to send the transport packet directly to the firmware, the hardware assist may be bypassed and the transport packet may be sent directly to the firmware, at a next block 645. The firmware may have the capability to parse the inputs in their original formats. The transport packets may then be processed by the firmware at block 650.

Therefore, in an embodiment of the invention, where the hardware assist may determine the format of incoming transport packets and parse them accordingly, then the firmware completes processing the packets in a similar way regardless of the original format of the packet. This may minimize the amount of processing by the firmware, hence speeding up the overall processing time of the system.

The received transport packets may be stored in the memory, and may be therefore made available for the firmware in its original format. The firmware may determine whether or not to employ the hardware assist fields in processing a received packet. Therefore, the decision made at 613 may be made by the firmware. If the firmware is bypassed, hardware assist fields may be utilized to parse the packet and the firmware may complete the remaining needed processing associated with the packet. If the firmware determines that hardware assist fields may not be used, then the packet may be parsed and processed entirely by the firmware.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing a plurality of data packets, said system comprising:
   a first circuit for processing a portion of a packet, thereby resulting in a partially processed packet, said processing comprising transcoding data of said portion of said packet into a common format, wherein the packet comprises data in any one of a plurality of video or audio formats, said first circuit comprising:
   a plurality of first parsing units operable for first parsing the data packets, wherein the plurality of first parsing units performs a portion of said processing of the packet by way of parsing based on a type of format of the packet and outputs a first information associated with the packet;
   a plurality of second parsing units operable for second parsing the first information associated with the packet, and outputting a second information associated with the packet;
   a subcircuitry for organizing the second information; and
   a memory for storing the organized second information, wherein the second information is input into the second circuit; and
   a second circuit for executing a plurality of instructions, wherein execution of said plurality of instructions causes processing of the partially processed packet, and wherein said plurality of instructions is independent of said plurality of video or audio formats.

2. The system according to claim 1, wherein processing a portion of the packet comprises:
   determining a format associated with the packet;
   preprocessing the packet in a first parsing unit based on the format of the packet;
   extracting information from the preprocessed packet in a second parsing unit; and
   writing the extracted information regarding the packet to a memory.

3. The system according to claim 1, wherein said processing the partially processed packet comprises:

reading information regarding the packet from a memory;
processing the partially processed packet using the read information; and
outputting the processed packet.

4. The system according to claim 1, wherein the first circuit comprises a first subcircuit for processing MPEG data, a second subcircuit for processing DirectTV data, and a third subcircuit for processing DVD/program stream data.

5. The system according to claim 1, wherein the second circuit comprises a processor used for executing said plurality of instructions.

6. The system according to claim 1 wherein the first circuit is bypassed and the data is wholly processed by said second circuit.

7. A method for processing a plurality of data packets, said method comprising:
processing a portion of a packet comprising:
first parsing the packet resulting in parsed first information associated with the packet;
second parsing the parsed first information associated with the packet resulting in parsed second information associated with the packet;
organizing the parsed second information associated with the packet; and
storing the organized parsed second information associated with the packet, thereby resulting in a partially processed packet, said processing comprising transcoding data of said portion of said packet into a common format, wherein the packet comprises data in any one of a plurality of at least one of video and audio formats; and
executing a plurality of instructions, wherein execution of said plurality of instructions causes processing of the partially processed packet, and wherein the plurality of instructions is independent of said any one of a plurality of at least one of video and audio formats.

8. The method according to claim 7, wherein processing a portion of the first packet comprises:
determining a format associated with the packet;
preprocessing the packet in a first parsing unit based on the format of the packet;
extracting information from the preprocessed packet in a second parsing unit; and
writing the extracted information regarding the packet to a memory.

9. The method according to claim 7, wherein processing the partially processed first packet comprises:
reading information regarding the packet from a memory;
processing the partially processed packet using the read information; and
outputting the processed packet.

10. The method according to Claim 7, wherein said first parsing comprises at least one of:
parsing MPEG data:
parsing DirecTV data; and
parsing DVD/program stream data.

11. The method according to claim 7, wherein a processor is operable to execute the plurality of instructions.

12. The method according to claim 7 wherein the processing of the portion of the packet is bypassed.

13. The system of claim 1 wherein the video formats comprises MPEG, VC1, or AVC.

14. The system of claim 1 wherein the audio formats comprises AC3 and AAC.

15. The system of claim 1 wherein processing the portion of the packet performs error parsing.

16. The system of claim 1 wherein processing the portion of the packet performs adaptation field parsing.

17. The system of claim 1 wherein processing the portion of the packet performs PES header parsing.

18. The system of claim 1 wherein processing the portion of the packet performs PTS/DTS (Presentation/Decode Time Stamp) extraction.

19. The system of claim 1 wherein processing the portion of the packet locates ES bytes in the packet.

20. The system of claim 1 wherein processing the portion of the packet performs data stream pattern comparisons.

21. The method of claim 7 wherein the video formats comprises MPEG, VC1, or AVC.

22. The method of claim 7 wherein the audio formats comprises AC3 and AAC.

23. The method of claim 7 wherein processing the portion of the packet performs error parsing.

24. The method of claim 7 wherein processing the portion of the packet performs adaptation field parsing.

25. The method of claim 7 wherein processing the portion of the packet performs PES header parsing.

26. The method of claim 7 wherein processing the portion of the packet performs PTS/DTS (Presentation/Decode Time Stamp) extraction.

27. The method of claim 7 wherein processing the portion of the packet locates ES bytes in the packet.

28. The method of claim 7 wherein processing the portion of the packet performs data stream pattern comparisons.

29. A system for processing data efficiently comprising:
one or more circuits operable for, at least:
receiving data packets in one or more formats;
first parsing said data packets to generate first parsed data packets;
first processing said first parsed data packets to yield transcoded data packets having a common format; and
storing said transcoded data packets into a memory; and
a processor operable for, at least:
reading said transcoded data packets from said memory; and
executing a set of instructions that is common to said one or more formats, said executing to perform:
second parsing of said received data packets if said first parsing was bypassed; and
second processing of said transcoded data packets, wherein said set of instructions is independent of said one or more formats.

30. The system of claim 29 wherein said data packets comprises MPEG data packets.

31. The system of claim 29 wherein said data packets comprises DirecTV data packets.

32. The system of claim 29 wherein said data packets comprises DVD/program stream data packets.

33. The system of claim 29 wherein said data packets comprises video data formatted using MPEG, VC1, or AVC.

34. The system of claim 29 wherein said data packets comprises audio data formatted using AC3 and AAC.

35. The system of claim 29 wherein said first parsing comprises error parsing.

36. The system of claim 29 wherein said first parsing comprises adaptation field parsing.

37. The system of claim 29 wherein said first parsing comprises PES header parsing.

38. The system of claim 29 wherein said first parsing comprises PTS/DTS (Presentation/Decode Time Stamp) extraction.

39. The system of claim 29 wherein said first processing comprises locating ES bytes in said data packets.

40. The system of claim 29 wherein said first processing comprises comparing data stream patterns.

41. A method of processing data efficiently comprising:
receiving data packets in one or more formats;
first parsing said data packets to generate a first parsed data packets;
first processing said first parsed data packets to yield transcoded data packets having a common format;
storing said transcoded data packets into a memory;
reading said transcoded data packets from said memory; and
executing a set of instructions that is common to said one or more formats, said executing to perform:
second parsing of said received data packets if said first parsing was bypassed; and
second processing of said transcoded data packets, wherein said set of instructions is independent of said one or more formats.

42. The method of claim 41 wherein said data packets comprises MPEG data packets.

43. The method of claim 41 wherein said data packets comprises DirecTV data packets.

44. The method of claim 41 wherein said data packets comprises DVD/program stream data packets.

45. The method of claim 41 wherein said data packets comprises video data formatted using MPEG, VC1, or AVC.

46. The method of claim 41 wherein said data packets comprises audio data formatted using AC3 and AAC.

47. The method of claim 41 wherein said first parsing comprises error parsing.

48. The method of claim 41 wherein said first parsing comprises adaptation field parsing.

49. The method of claim 41 wherein said first parsing comprises PES header parsing.

50. The method of claim 41 wherein said first parsing comprises PTS/DTS (Presentation/Decode Time Stamp) extraction.

51. The method of claim 41 wherein said first processing comprises locating ES bytes in said data packets.

52. The method of claim 41 wherein said first processing comprises comparing data stream patterns.

* * * * *